(12) United States Patent
Koslow

(10) Patent No.: US 7,306,111 B2
(45) Date of Patent: Dec. 11, 2007

(54) FILTER HOUSING

(75) Inventor: Evan E. Koslow, Weston, CT (US)

(73) Assignee: KX Technologies LLC, Orange, CT (US)

( * ) Notice: Subject to any disclaimer, the term of this patent is extended or adjusted under 35 U.S.C. 154(b) by 110 days.

(21) Appl. No.: 10/799,547

(22) Filed: Mar. 11, 2004

(65) Prior Publication Data
US 2005/0199536 A1 Sep. 15, 2005

(51) Int. Cl.
B65D 45/00 (2006.01)
(52) U.S. Cl. .............. 220/316; 210/443; 210/450; 210/232; 220/315
(58) Field of Classification Search ........... 210/436, 210/443, 440, 444, 445, 450, 232, 199, 303, 210/472, 97, 238, 133; 220/315, 324, 326, 220/322, 319, 320, 811, 827, 321, 203.09
See application file for complete search history.

(56) References Cited

U.S. PATENT DOCUMENTS

| 831,535 | A | * | 9/1906 | Johnston ..................... 238/42 |
| 5,114,572 | A | * | 5/1992 | Hunter et al. ............... 210/120 |
| 5,294,335 | A | * | 3/1994 | Chiang ....................... 210/169 |
| 5,678,721 | A | * | 10/1997 | Cartigny et al. ............ 220/316 |

* cited by examiner

Primary Examiner—Krishnan S. Menon
Assistant Examiner—Benjamin Kurtz
(74) Attorney, Agent, or Firm—DeLio & Peterson, LLC; Robert Curcio

(57) ABSTRACT

A filter housing having radial sealing means is disclosed herein. Push-button actuated clamps can be used to attach the head to the sump for easy opening and closing the filter housing when replacing the filter cartridge. The filter housing of the present invention provides simplified filter cartridge changes to minimize process downtime and without recourse to tools.

4 Claims, 5 Drawing Sheets

FILTER HOUSING

This invention is directed to a filter housing having a radial sealing mechanism such that large axial compression forces are not needed to provide a liquid-tight seal. Additionally, push-button actuated clamps can be used to attach the head to the sump for ease of opening and closing the filter housing when replacing the filter cartridge.

SUMMARY OF THE INVENTION

The present invention is directed to a filter housing comprising: a sump for enclosing a filter cartridge within the filter housing; a head having an inlet and an outlet in fluid communication with the filter cartridge, the head removably attached to the sump; a radial sealing means for providing a liquid-tight seal between the sump and the head; a pressure relief mechanism for depressurizing the sump prior to removing the sump from the head; at least one clamp for attaching the sump to the head; and a clamp actuator.

Preferably, the means for providing a liquid-tight seal between the sump and the head is attached to the head. The radial sealing means may comprise an O-ring, a quad seal, or a gasket. The at least one clamp can be driven with one or more springs and/or can be positioned in a horizontal plane around corresponding rims of the head and the sump. The clamp actuator may comprise a linear cam in mechanical communication with the at least one clamp, a rotary cam in conjunction with a linear cam, and the like. Preferably, the filter housing further includes a safety mechanism that is responsive to a pressure inside the filter housing. The safety mechanism locks the clamp actuating mechanism to prevent opening the at least one clamp when the filter housing is pressurized. Preferably, the filter housing may further include means for locking the at least one clamp in an open position to facilitate removal of the sump or locking the at least one clamp in a closed position when the sump is attached to the head. Preferably, the filter housing further includes a filter cartridge wherein the filter cartridge can have one or more sealing means with a stub end cap, wherein a filtered fluid flows through the stub end cap and out through the outlet of the head.

In another aspect, the present invention is directed to a filter housing comprising: a sump for enclosing a filter within the filter housing; a head removably attached to the sump, the head having an inlet and an outlet in fluid communication with the filter cartridge; a radial sealing means for providing a liquid-tight seal between the sump and the head; a pressure relief mechanism for depressurizing the sump prior to removing the sump from the head; at least two clamps in peripheral arrangement for attaching the head and the sump, the at least two clamps having a planar portion thereof; and a linear cam in mechanical communication with the at least one clamp at an interface with the planar portion of the at least one clamp such that upon actuating the linear cam, the linear cam moves the at least one clamp to an open position to facilitate removal of the sump or to a closed position to attach the sump to the head.

Preferably, the radial sealing means comprises an O-ring, a quad seal, or a gasket. The at least one clamp can be driven with one or more springs. The filter housing may further include a safety mechanism that is responsive to a pressure inside the filter housing. Preferably, the safety mechanism locks the clamp actuating mechanism to prevent opening the at least one clamp when the filter housing is pressurized.

In yet another aspect, the present invention is directed to a filter housing comprising: a sump for enclosing a filter within the filter housing; a head removably attached to the sump, the head having an inlet and an outlet in fluid communication with the filter cartridge; a radial sealing means for providing a liquid-tight seal between the sump and the head; a pressure relief mechanism for depressurizing the sump prior to removing the sump from the head; at least two clamps under a tension load in peripheral arrangement for attaching the head and the sump, the at least two clamps having a planar portion thereof; and a clamp actuating mechanism comprising a linear cam in conjunction with a rotary cam wherein the linear motion of the linear cam is translated to rotational motion of the rotary cam to open the at least two clamps when the linear cam is moved along a plane.

Preferably, the radial sealing means comprises an O-ring, a quad seal, or a gasket. The filter housing may further include a safety mechanism that is responsive to a pressure inside the filter housing.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s), which follows, taken in conjunction with the accompanying drawings in which:

DETAILED DESCRIPTION OF THE PREFERRED EMBODIMENTS(S)

In describing the preferred embodiment of the present invention, reference will be made herein to FIGS. 1 to 4 of the drawings in which like numerals refer to like features of the invention. Features of the invention are not necessarily shown to scale.

The present invention is directed to a filter housing assembly for filtration of liquids, including the interception of chemical, particulate, and/or microbiological contaminants. The use of radial sealing means between the head and the sump allows a minimum of force to provide a liquid-tight seal without the need for excess force and tight tolerances essential in prior art filter housings that use axial seals. The filter housing of the present invention provides simplified filter cartridge changes to minimize process downtime and without recourse to tools. A simple push-button mechanism actuates a set of clamps that hold and release the filter housing sump. A pressure relief mechanism, alone or in combination with other safety mechanisms, are disclosed as well.

The filter housing of the present invention includes a head in fluid communication with the influent, a filter cartridge, and the effluent; a sump that houses the filter cartridge; a radial sealing means positioned between the head and the sump; and at least one moveable clamp, and preferably two such clamps, arranged peripherally for embracing and thereby clamping together the head and sump when the filter housing is in an operative, closed position, and clearing the rims of the head and sump when the filter housing is in an inoperative, open position. The one or more clamps, which are positioned in their respective horizontal plane around the corresponding rims of the head and the sump, are moved outwards with a clamp actuating mechanism until the corresponding rims are cleared for opening the filter housing. A clamp actuating mechanism is disclosed that comprises a device that translates one directional motion into another directional motion to engage the clamps in an open or closed position through either direct translation or rotational translation.

Figure 1:
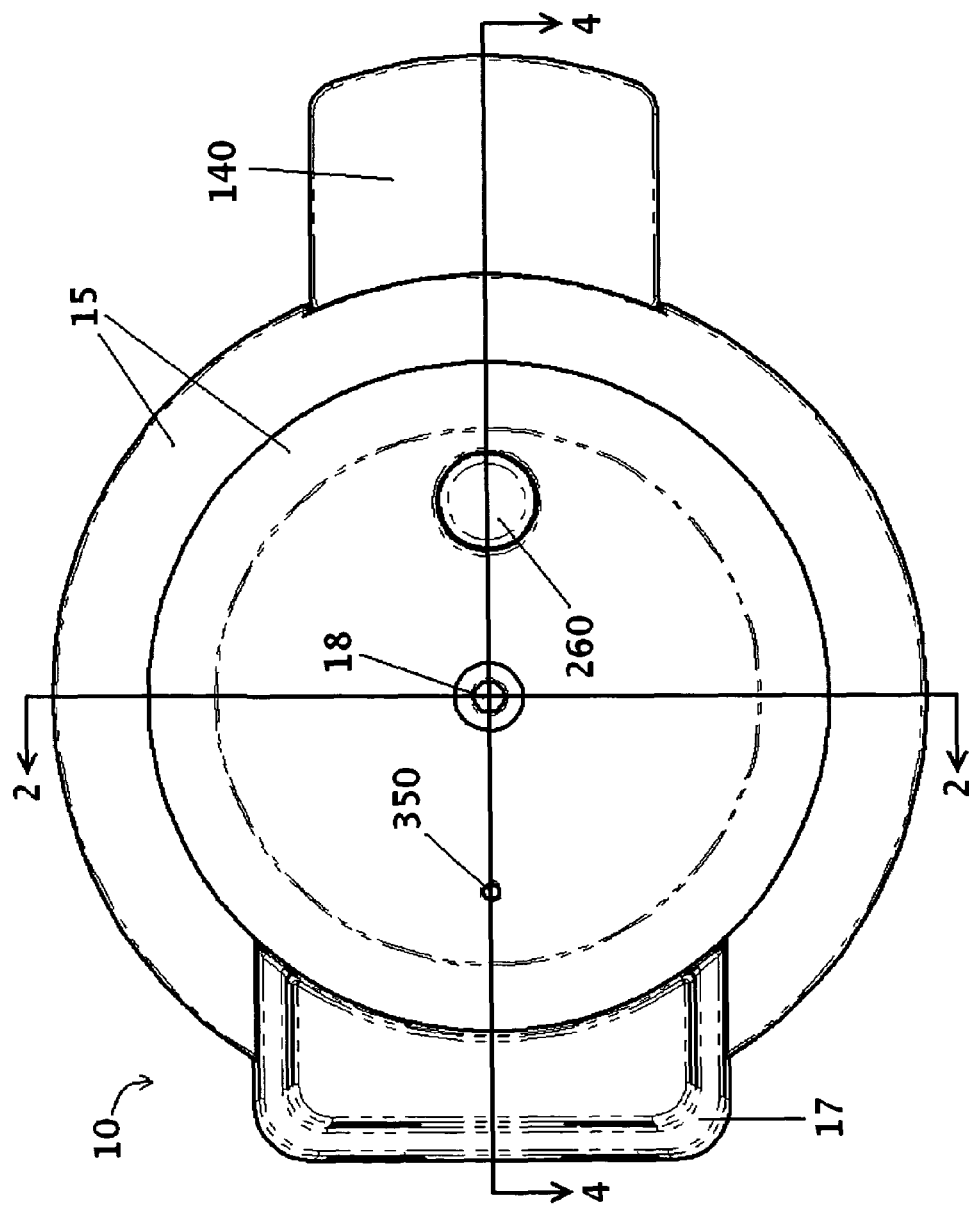
FIG. 1 is a top plan view of the filter housing of the present invention in the closed operative position.

FIG. 1 is a top plan view of the filter housing of the present invention. The filter housing has a head 10 covered by cap 15. A center screw 18 attaches cap 15 to head 10. Mounting bracket 17 allows a user to attach head 10 to a wall or other stationary location with mounting screws and the like. Cross-sectional views of the filter housing are taken at lines 2-2, shown in FIG. 2, and at lines 4-4, shown in FIG. 4.

Figure 2:
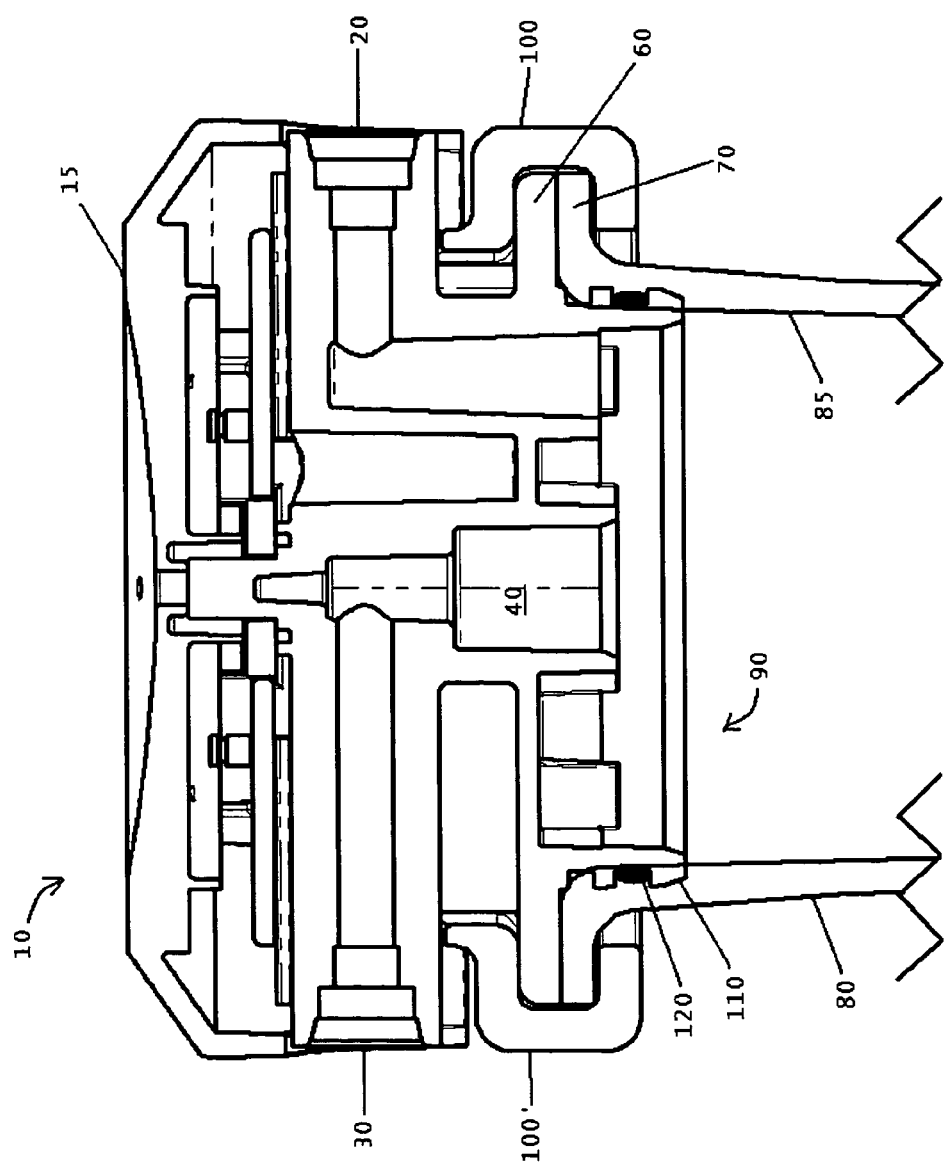
FIG. 2 is a cross sectional side plan view of the head of the filter housing of FIG. 1 along lines 2-2.

In FIG. 2, a cross-sectional view of head 10 taken at lines 2-2 in FIG. 1, head 10 has an inlet 20 and an outlet 30. Head 10 has an outlet port 40 wherein a filter cartridge 50 is inserted therein such that an influent enters inlet 20, flows through filter cartridge 50, and the filtered effluent flows out from outlet port 40 to outlet 30. Head 10 has a head rim 60 that corresponds to a sump rim 70 on sump 80. Head rim 60 and sump rim 70 are held in place with clamps 100, 100' when the head is in a closed operative position. Clamps 100, 100' are preferably made of a non-deformable material, such as, for example only, metal. Preferably, the clamps are made of die cast aluminum.

Opening 90 of head 10 sits below sump rim 70 when the head and sump are assembled together. Sump 80 has inner wall 85 that tapers slightly towards the base of sump 80. Situated around the circumference of opening 90 is a groove 110 with a radial sealing means, such as, for example only, an O-ring 120. The walls of opening 90 fit into sump 80 with little or no resistance for a snug, yet slidable, fit. As inner wall 85 tapers in, sealing means 120 within groove 110 provides a radial seal that expands outward against the tapered inner walls 85 of sump 80. Sealing means 120 can be an O-ring, quad seal, gasket, and the like, preferably of an elastomeric material. Therefore, by simply clamping head 10 to sump 80 at their corresponding rims at sufficient positions to provide uniform compression, the force of the clamps is sufficient to provide a liquid-tight seal when the head and sump are fitted together. Large compression forces are no longer needed to provide a liquid-tight seal within the filter housing. Likewise, tolerances on the length of the filter housing for such radially sealed filter housings of the present invention are also more forgiving, especially if a filter element interfaces to outlet port 40 via a single or double O-ring that radially engage the walls of outlet port 40 over a significant depth through outlet port 40.

Figure 3:
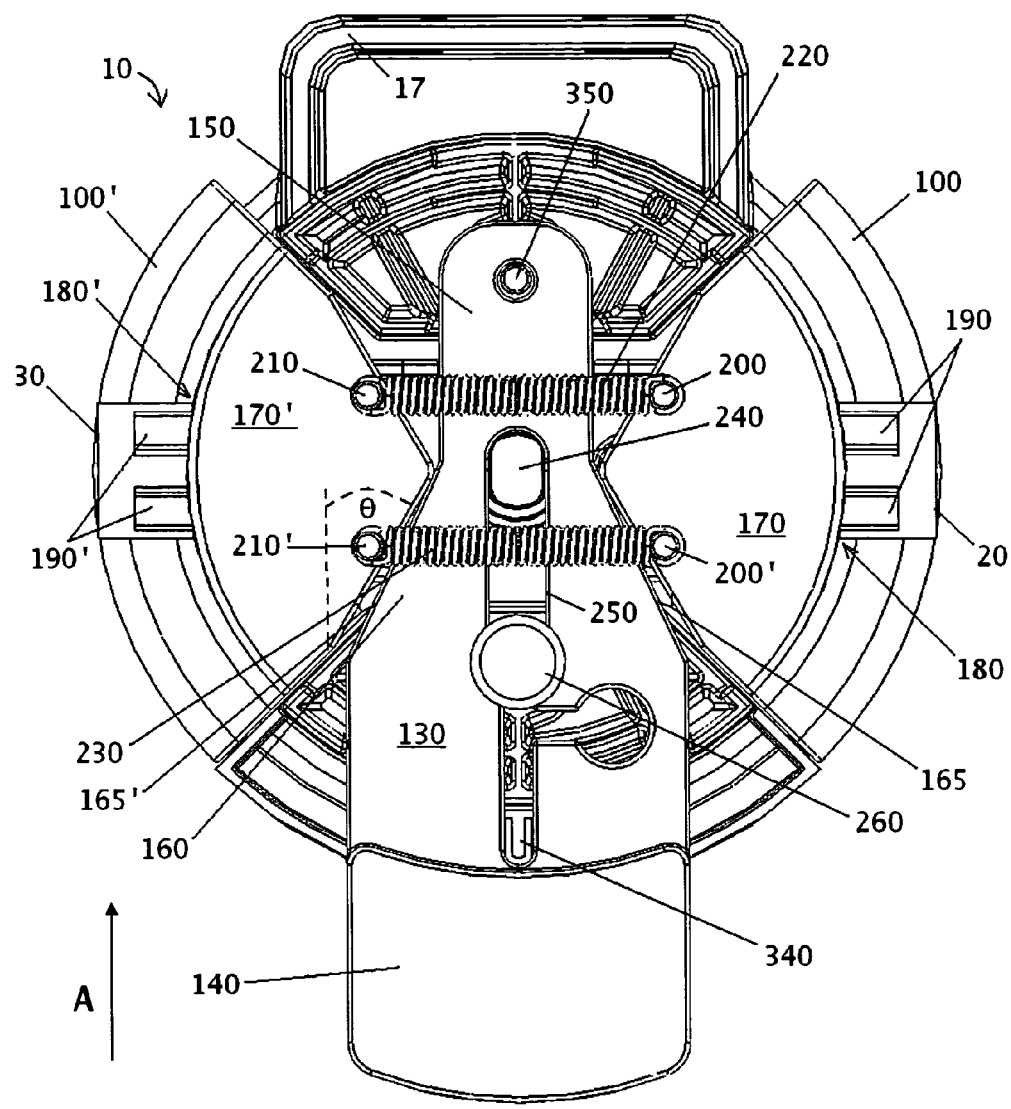
FIG. 3 is a top plan view of the head of a filter housing of the present invention in the closed position.

Since radial sealing means do not require tremendous compression forces to provide a liquid-tight seal in the filter housing, a set of clamps is sufficient to provide an adequate seal. FIG. 3 illustrates a top plan view of head 10. In one preferred embodiment, the clamp actuating mechanism comprises a linear cam 130 having a push button end 140, a stub nose 150 distal from push button 140, and an angled portion 160. Linear cam 130 translates motion in the direction of arrow A into a perpendicular motion that actuates clamps 100, 100' in an open or closed position through direct translation. Angled portion 160 is situated between planar portions 170, 170' of clamps 100, 100'. Planar portions 170, 170' are inversely angled at interface 165, 165' to correspond to angled portion 160 on linear cam 130. Although not to be bound to any one configuration, planar portions 170, 170' are symmetrically shaped to provide even movement of clamps 100, 100' when linear cam 130 is moved in the direction of arrow A. Apertures 180, 180' through a vertical portion (hidden) of the clamps allow clamps 100, 100' to slide along the elongated, tubular configurations of inlet 20 and outlet 30. Furthermore, the tubular inlet and outlet have tracks 190, 190' for guiding clamps 100, 100'. Tracks 190, 190' are preferably molded into the head. Clamps 100, 100' can be keyed to interface with tracks 190, 190' to ensure that the clamps travel in a substantially consistent linear direction without bowing or other misalignment.

Vertical driving pins 200, 200' located on clamp 100, project upwards from planar portion 170. Complimentary vertical driving pins 210, 210' located on clamp 100' project upwards from planar portion 170'. Spring means 220 attached between opposing vertical driving pins 200, 210, and spring means 230 attached between opposing vertical driving pins 200', 210' have a sufficient load to place a continual strain on clamps 100, 110' to keep the clamps in a closed position until the clamp actuating mechanism is engaged.

Extending from a top surface of head 10 is an axial pin 240 that is engaged within a guide slot 250 along linear cam 130. Guide slot 250 runs along the vertical axis of head 10 as shown in the top plan view of FIG. 2. To provide even force on clamps 100, 100', guide slot 250 is equidistant between the two clamps. Therefore, as the user applies pressure on push button 140, linear cam 130 moves in the direction of arrow A. Angled portion 160 of linear cam 130 slides along the corresponding inverse angles of clamps 100, 100' at interface 165, 165' to open the clamps and release sump 80 when the clamps clear rim 70 on sump 80. Angle θ is preferably less than 45°, more preferably less than about 30°, and most preferably about 25°, such that the ratio of movement of linear cam 130 to the movement of the clamps is less than 1:1. A ratio of greater than or equal to 1:1 produces significantly more friction, and therefore, demands more force to move the clamps. Preferably, as linear cam 130 is moved in the direction of arrow A, clamps 100, 100' are each moved half the distance as linear cam 130 so that a user only needs to exert moderate force on push button 140 to actuate the clamps.

Figure 4:
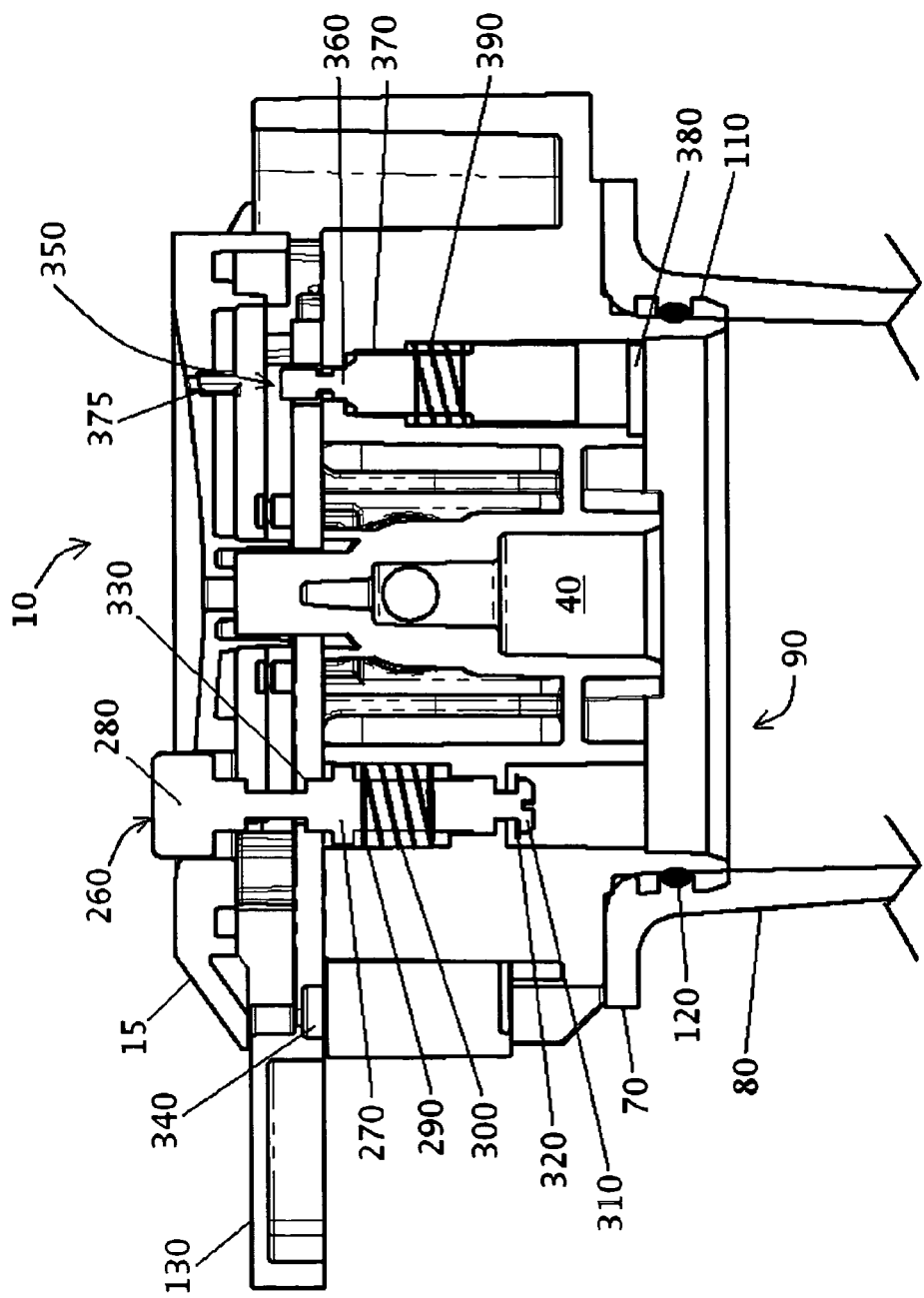
FIG. 4 is a cross sectional side plan view of the head shown in FIG. 2 along lines 4-4 when the filter housing is locked in the open position.

When the filter housing has been pressurized, it is advantageous to depressurize the filter housing prior to engaging the push button of the linear cam to open the clamps and release the sump. FIG. 4 illustrates a cross sectional view of head 10 along lines 4-4 in FIG. 1 to show pressure relief mechanism 260 in cross section. Pressure relief mechanism 260 has a piston 270 that extends through cap 15 as button 280 on the top surface of head 10 and through linear guide slot 250 of linear cam 130 into a cylindrical bore 290 that is in pressure communication with sump 80. Piston 270 situated within cylindrical bore 290 is actuated via spring means 300. Although a compression spring is shown, any appropriate spring means may be used to actuate piston 280.

Button 280 at the top of piston 270 can be red or some other bright color to alert the user. By depressing button 280, piston 270 is unseated from flange 310 having a gasket 320 to release the pressure within sump 80. Fluid within the filter housing travels up along the sides of cylindrical bore 290 and is released to the atmosphere. When the pressure within the housing has been released, linear cam 130 can be moved to the open position and piston 280 locks linear cam 130 in an open position when shoulder 330 of piston 280 is seated within an undercut 340 (shown in FIG. 3) in linear cam 130. When the user is ready to close the filter housing and engage clamps 100, 100', button 290 is depressed again to release the spring-loaded clamps and lock linear cam 130 in a closed position.

A safety device can be incorporated into the filter housing of the present invention. In FIG. 2, safety plug 350 is seen from a top plan view. A cross sectional view can be seen in FIG. 3 wherein safety stem 360 is situated within a second cylindrical bore 370. The top of safety stem 360 can be seen in corresponding aperture 385 in cap 15. When the filter housing is in a closed position, pressure within the filter housing pushes safety plug 350 into a corresponding aperture 375 in linear cam 130 thereby locking linear cam 130 in place. When pressure relief mechanism 260 is engaged, compression spring means 390 provides the necessary counter-force to move safety stem 360 below aperture 375 to unlock linear cam 130. In the event that the pressure relief mechanism malfunctions and the filter housing needs to be depressurized, a user may insert an appropriate tool to push safety plug 350 down below the aperture in the linear cam to release the pressure within the filter housing. Retainer 380 located at the base of cylindrical bore 370 prevents safety stem 360 from extending beyond the end of cylindrical bore 370.

Figure 5:
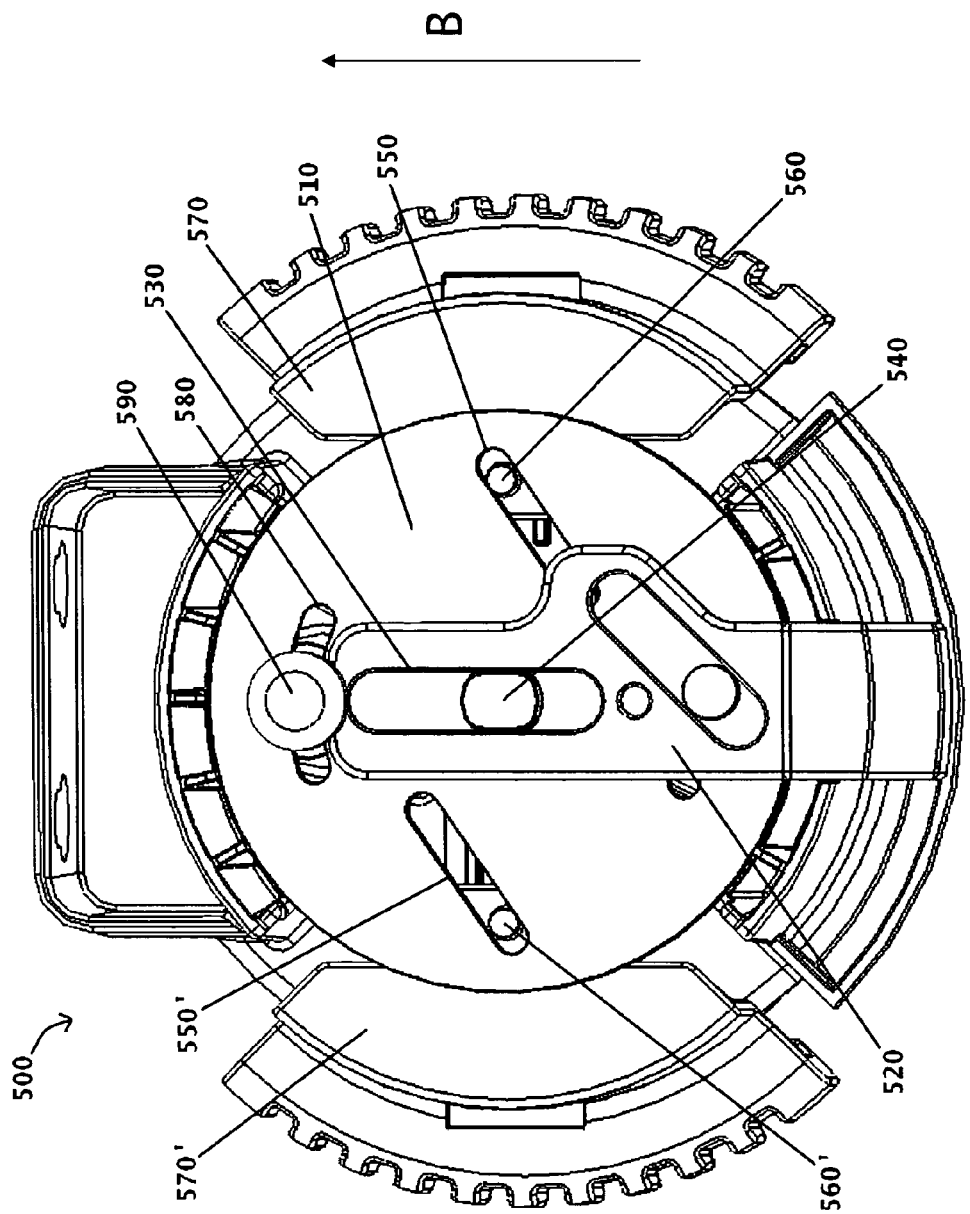
FIG. 5 is a top plan view of another filter housing of the present invention in an open, un-operative position.

Another clamp actuating mechanism utilizing a two part mechanism in the filter housing of the present invention is shown in FIG. 5 wherein the head of the filter housing is shown in an open position. This device translates a linear motion into a rotational motion to engage the clamps in an open or closed position through rotational translation. Head 500 is shown in a top plan view with a clamp actuating mechanism comprising of a rotary cam 510 and a linear cam 520. Rotary cam 510 has a center slot 530 that is fitted to an axial pin 540 extending from a top surface of head 500. Rotary cam 510 further includes a first linear track 550 and a second linear track 550' equidistant from slot 530 and being parallel to one another. Both linear tracks are preferably less than a 45° angle. Tracking pins 560, 560' extending from the top surface of clamps 570, 570' travel within each of the linear tracks when rotary cam 510 is engaged when linear cam 520 is moved in the direction of arrow B.

Rotary cam 510 further includes a curved track 580 where a pressure relief mechanism 590 can extend through a top surface of the cam and through to the cap (not shown) of head 500. Curved track 580 has at least two undercuts for locking rotary cam 510 and linear cam 520 in an open position. When the user is ready to close the filter housing and engage clamps 570, 570', pressure relief mechanism 590 is depressed again to release the spring loaded clamps and lock both cams in position.

All parts of the filter housing can be made using molded plastic parts according to processes known in the art. The clamps, may, in some cases be manufactured from die-cast metal.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A filter housing comprising:
   a sump for enclosing a filter within said filter housing;
   a head removably attached to said sump, said head having an inlet and an outlet in fluid communication with the filter cartridge;
   a radial sealing means for providing a liquid-tight seal between said sump and said head;
   a pressure relief mechanism for depressurizing said sump prior to removing said sump from said head;
   at least two clamps under a tension load in peripheral arrangement for attaching said head and said sump, said at least two clamps having a planar portion thereof; and
   a clamp actuating mechanism comprising a radial linear cam in conjunction with a rotary cam, said rotary cam comprising:
      a slotted tab including:
         a center slot fitted to an axial pin extending from a top surface of said head, said center slot in a radial direction; and
         a second slot fitted to a second pin off-axis from said axial pin, said second slot angled relative to said center slot in a non-radial direction, such that upon radially linear movement of said slotted tab and said center slot relative to said axial pin, said second slot is moved while in slidable communication with said second pin, causing said rotary cam to rotate;
      a first linear track and a second linear track equidistant from said center slot and being parallel to one another; and
      tracking pins extending from said clamps top surface traveling within each of said linear tracks when said rotary cam is engaged when said linear cam is moved in a radially linear direction, wherein the radially linear motion of the linear cam is translated to rotational motion of the rotary cam to open said at least two clamps when said linear cam is moved along a plane.

2. A filter housing claim 1 wherein said radial sealing means comprises an O-ring, a quad seal, or a gasket.

3. A filter housing of claim 1 further including a safety mechanism that is responsive to a pressure inside said filter housing.

4. A filter housing comprising:
   a sump for enclosing a filter cartridge within said filter housing;
   a head having an inlet and an outlet in fluid communication with the filter cartridge, said head removably attached to said sump;
   a radial sealing means for providing a liquid-tight seal between said sump and said head;
   a pressure relief mechanism for depressurizing said sump prior to removing said sump from said head; and
   a clamp actuator comprising a rotary cam in conjunction with a linear cam, said rotary cam comprising:
   a slotted tab including:
   a first slot slidably fitted to a center axial pin extending from a top surface of said head;
   a second slot slidably fitted to a pin off-axis from said center axial pin, said second slot angled relative to said first slot, such that said rotary cam is engaged when said slotted tab is moved in a radial, linear direction;
   a first linear track and a second linear track equidistant from said center slot and being parallel to one another; and
   tracking pins extending from said clamps top surface traveling within each of said linear tracks when said rotary cam is engaged when said linear cam is moved in said radial, linear direction.

* * * * *